（12）United States Patent
Czompo

(10) Patent No.: US 9,977,839 B2
(45) Date of Patent: May 22, 2018

(54) IMPROVING ACCURACY OF TIME OF EVENT DETERMINATION AT SENSOR DEVICE

(71) Applicant: QUALCOMM Incorporated, San Diego, CA (US)

(72) Inventor: Joseph Czompo, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 232 days.

(21) Appl. No.: 14/866,287

(22) Filed: Sep. 25, 2015

(65) Prior Publication Data

US 2016/0356634 A1 Dec. 8, 2016

Related U.S. Application Data

(60) Provisional application No. 62/171,810, filed on Jun. 5, 2015.

(51) Int. Cl.
G06F 17/40 (2006.01)
G01D 18/00 (2006.01)
G06F 15/00 (2006.01)
G06F 11/34 (2006.01)
G01D 21/00 (2006.01)

(52) U.S. Cl.
CPC .............. *G06F 17/40* (2013.01); *G01D 18/00* (2013.01); *G01D 21/00* (2013.01); *G06F 11/34* (2013.01); *G06F 15/00* (2013.01)

(58) Field of Classification Search
CPC .............................. G01D 18/00; G01D 21/00
See application file for complete search history.

(56) References Cited

U.S. PATENT DOCUMENTS

| 7,788,332 | B2 | 8/2010 | Manohar et al. |
| 7,937,232 | B1 | 5/2011 | Chow et al. |
| 8,910,522 | B2 | 12/2014 | Sheynblat |
| 2010/0305899 | A1* | 12/2010 | Czompo ............... G01C 21/16 702/152 |
| 2012/0140594 | A1* | 6/2012 | Cook ..................... G01V 1/375 367/40 |
| 2012/0290266 | A1* | 11/2012 | Jain ..................... G06F 19/3406 702/187 |
| 2014/0257730 | A1 | 9/2014 | Czompo |
| 2015/0077217 | A1* | 3/2015 | Lammel ................ G01D 3/022 340/4.2 |
| 2015/0127290 | A1 | 5/2015 | Plasterer et al. |
| 2015/0317230 | A1* | 11/2015 | Le Grand .......... G06F 11/3476 702/187 |

* cited by examiner

*Primary Examiner* — Ajay Ojha
(74) *Attorney, Agent, or Firm* — Jae-Hee Choi; Kilpatrick Townsend & Stockton

(57) ABSTRACT

Systems, devices, methods, and computer-program products for reducing sensor reading time error and estimating the time of an event sensed by a sensor are presented. According to implementations, a sensor indicates to a system with which it interacts, the time when an event occurred. In some implementations, the sensor can generate an interrupt that is usable by the system to estimate the time when the event occurred. In implementations, the sensor can output a correction value that is usable by the system to estimate when the event occurred.

37 Claims, 12 Drawing Sheets

IMPROVING ACCURACY OF TIME OF EVENT DETERMINATION AT SENSOR DEVICE

CROSS-REFERENCE TO RELATED APPLICATIONS

This application claims the benefit of U.S. Provisional Application No. 62/171,810, filed Jun. 5, 2015, entitled "SAMPLING DELAY INDICATIONS IN MEMS SENSORS", which is incorporated herein by reference in its entirety.

FIELD

The present disclosure generally relates to sensor operation, and more specifically to techniques and systems for estimating the time of an event relating to sensor reading.

BACKGROUND

Many systems, such as systems present within a mobile device, may need to synchronize an event sensed by a sensor with other pieces of information such as readings from other sensors, with data, signals, events, and readings. Examples of such sensors include inertial sensors (i.e. accelerometers, gyroscopes) or other sensors (e.g. magnetometers, pressure sensors, etc.). Mobile devices such as cellular phones, smart phones, tablets, Personal Digital Assistants (PDAs), GPS units etc. often contain sensors. Various sensors can be implemented as micro-electromechanical systems (MEMS). The sensors can collect data regarding the environment of the device or physical events experienced by the device such as acceleration or rotation, as well as other physical quantities.

Using sensors present within the mobile device, a mobile device can determine its acceleration and/rotation, position, surrounding temperature, surrounding magnetic field, and so on. Examples of sensors include accelerometer, gyroscope, thermometer, positioning systems, accelerometer, etc. However, by the time a sensor reading is reported, some delay could have already occurred. It is challenging to efficiently and accurately estimate the time when an event actually occurred, and correlate the event with a sensor reading.

SUMMARY

Methods, systems, computer-readable media, and apparatuses for reducing a sensor reading time error and estimating the time of an event sensed by a sensor device are presented. According to implementations, a sensor device can acquire a sensor reading at a time when an event occurs. The sensor reading can be acquired at a sensing element. Optionally, the sensor reading can be processed into an output sample, a first value being the output sample. The sensor device can output to a system, the first value indicative of the sensor reading. The first value can be output to the system by a first register on the sensor device. The sensor device can output to the system, a correction value to account for delays within the sensor device and to assist the system in estimating the time when the event occurred.

In implementations, the correction value can be indicative of the difference between the time when the event occurs and an output time associated with output of the first value from the sensor device to the system. In examples, the correction value can be a delay time expressed in clock cycles of the sensor device or in absolute time. In implementations, the correction value can be output to the system by the sensor device from a second register on the sensor device. In some examples, the first output register can be the same as the second output register.

In some implementations, the sensor device can further generate an interrupt that is usable by the system to trigger a process for estimating the time when the event occurred.

According to some implementations, a system can receive from a sensor device, a first value indicative of a sensor reading. The system can further receive from the sensor device a correction value to account for delays within the sensor device and to assist the system in estimating the time when the event occurred. The system can assign to the first value a timestamp indicative of an output time associated with output of the first value. The system can estimate the time when the event occurred based at least on the correction value and the timestamp.

In implementations, the correction value can be indicative of the difference between the time when an event occurred and the output time. In implementations, the system can further receive an interrupt and trigger a process for estimating the time when the event occurred.

In implementations, the system can receive, from a second sensor device, a second value indicative of a second sensor reading. The system can matching the first value to the second value based on the time when the event occurred.

BRIEF DESCRIPTION OF THE DRAWINGS

Aspects of the disclosure are illustrated by way of example. In the accompanying figures, like reference numbers indicate similar elements, and.

DETAILED DESCRIPTION

Figure 1:
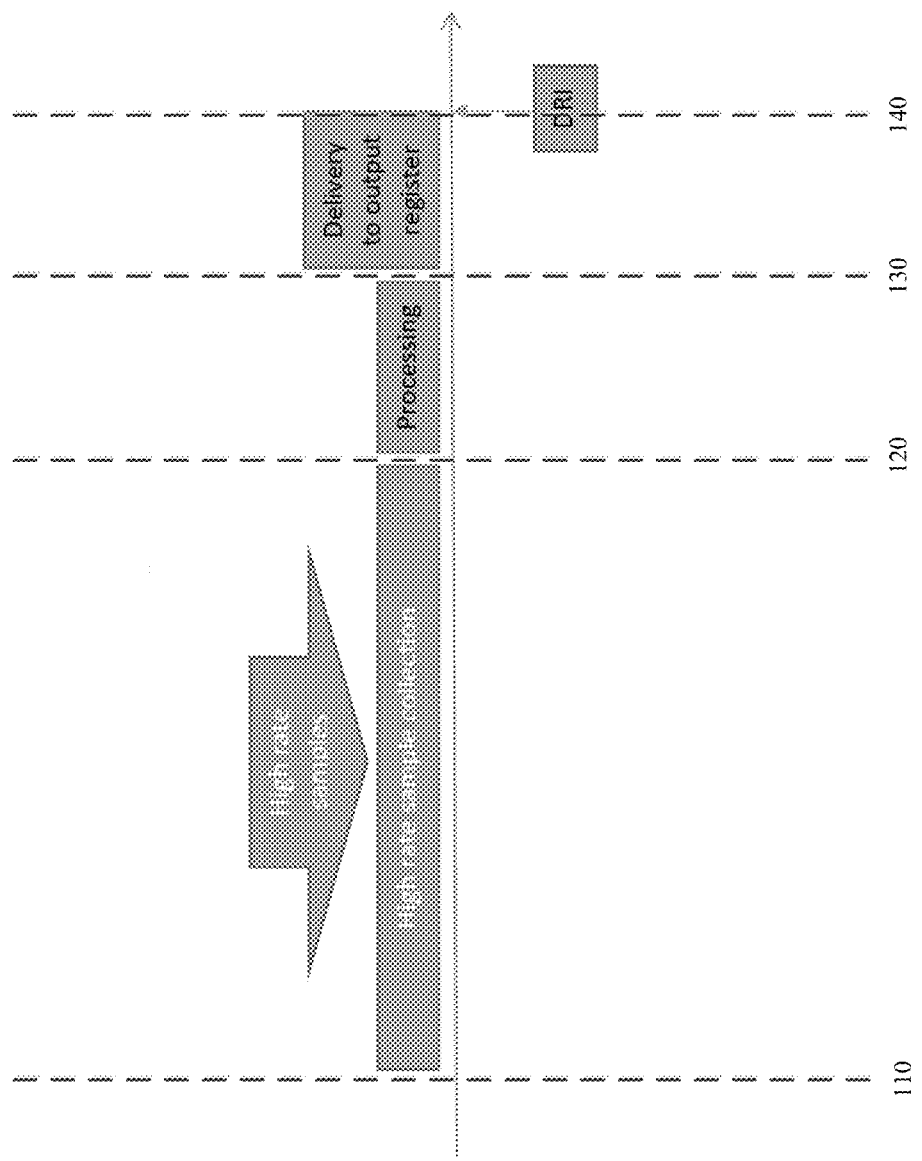
FIG. 1 illustrates a simplified timeline of a sensor measurement and sensor reading delivery.

Certain aspects and implementations of this disclosure are provided below. Some of these aspects and implementations may be applied independently and some of them may be applied in combination as would be apparent to those of skill in the art. In the following description, for the purposes of explanation, specific details are set forth in order to provide a thorough understanding of implementations of the invention. However, it will be apparent that various implementations may be practiced without these specific details. The figures and description are not intended to be restrictive.

The ensuing description provides exemplary implementations only, and is not intended to limit the scope, applicability, or configuration of the disclosure. Rather, the ensuing description of the exemplary implementations will provide those skilled in the art with an enabling description for implementing an exemplary implementation. It should be understood that various changes may be made in the function and arrangement of elements without departing from the spirit and scope of the invention as set forth in the appended claims.

Specific details are given in the following description to provide a thorough understanding of the implementations. However, it will be understood by one of ordinary skill in the art that the implementations may be practiced without these specific details. For example, circuits, systems, networks, processes, and other components may be shown as components in block diagram form in order not to obscure the implementations in unnecessary detail. In other instances, well-known circuits, processes, algorithms, structures, and techniques may be shown without unnecessary detail in order to avoid obscuring the implementations.

Also, it is noted that individual implementations may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

Furthermore, implementations may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a computer-readable or machine-readable medium. A processor(s) may perform the necessary tasks.

In order to synchronize data samples provided by inertial sensors with other sensor readings, with other data, signals, events, etc., it would be beneficial to know the time stamp associated with each of the data samples. Specifically, it would be beneficial to know not simply the time at which the sensor reading was made available, but the time at which the actual event sensed by the sensor occurred. Various internal delays are associated with readings from sensors. So the time at which a sensor reading or a value indicative of the sensor reading is made available is not the time at which an actual event or measurement occurred.

FIG. 1 illustrates a simplified timeline of a sensor measurement and sensor reading delivery that occurs within a sensor device. As shown in FIG. 1, an example sensor uses internal high rate sampling to generate an output sample. Sensors can use internal high rate samples to generate a lower rate output samples. In some examples, internal sampling can be carried out in the range of a few thousand samples per second (i.e. in the kHz range) and output samples can be generated in the range of one to a few hundred samples per second (i.e. in the 1 Hz-few hundred Hz range).

FIG. 1 depicts various processes in the sensing of an event and delivery of a value indicative of a sensor reading at various times. As shown, internal high rate sampling begins at time 110. Internal high rate sampling occurs until time 120, during which time a number of samples are collected to compute an output sample. Although not shown explicitly in FIG. 1, the actual physical event to be sensed occurs sometime between time 110 and time 120. In the example shown, an output sample begins to be computed once the last high rate sample to be used in the computation is available at time 120. Various internal computations are performed on the samples until time 130, and a value indicative of the sensor reading based on the output sample is delivered to the output register at time 140, when a Data Ready Interrupt (DRI) is generated. More detail regarding the sources of internal sensor delay will be provided later in the specification with reference to FIG. 4.

When the DRI is generated by the sensor, an external system interacting with the sensor device, comprising a data acquisition system, can read the value indicative of the sensor reading. The servicing Interrupt Servicing Routine (ISR), also part of the external system interacting with the sensor device, can read the clock of the data acquisition system and assign time 140 as the time stamp to the value indicative of the sensor reading. There can be a further delay between the time the DRI is generated and the time the ISR reads the clock of the data acquisition system. In implementations, such delay can be estimated by the external system fairly easily and accurately because the external system can have access to or control over components causing the delay.

However, internal delay at the sensor device, for example between time 120 and 140 in FIG. 1, may not be easy to estimate from the perspective of a system outside of the sensor 400. Besides, methods of estimating internal sensor delays may be expensive and/or inaccurate. For various reasons that will be explained further below, estimating or knowing the internal sensor delay can be important. It allows the system interacting with the sensor to deduce the time at which an event sensed by the sensor occurred. Some systems may approximate the time at which the sensor reading was available at the DRI as the time at which the event occurred. However, such an approximation could be inaccurate. Other systems may estimate the time at which the event occurred by compensating for the internal sensor delay. However, such systems may still be inaccurate, and also expensive in terms of time and resource utilization.

Data regarding approximate internal sensor delays could be made available by the sensor manufacturer in a user manual. The internal sensor delay can be dependent on various factors and parameters, and could be represented as a table of delay values for each condition. However, such information is not typically available, and even if available, may not be readily usable by a system interacting with the sensor device. Human intervention is often necessary to convert information available from the sensor device's user manual into a form usable by a system that is interacting with the sensor. Besides, internal sensor delay can be different for each sensor device (even of the same type); hence for accuracy, a manufacturer may have to test every sensor device under different conditions to develop each sensor device's own table. Thus it may be extremely time consuming, if not impossible, for a manufacturer to provide such information even if they wish to do so.

Figure 2:
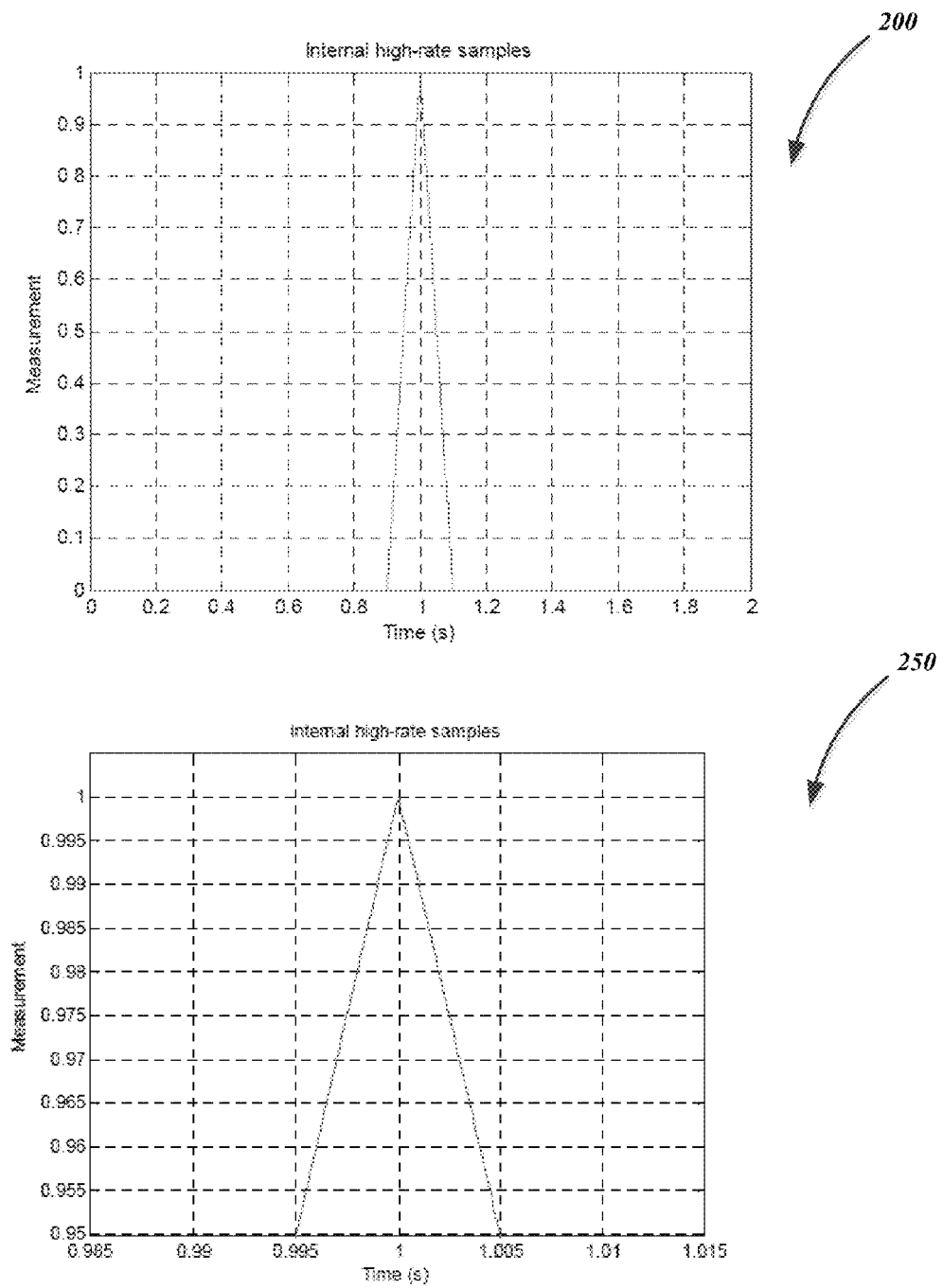
FIG. 2 is a graph depicting an internal high-rate sampling sensor measurement versus time for a sensed event, according to an implementation.

FIG. 2 is a graph depicting an internal high-rate sampling sensor measurement versus time—for a sensed event, according to an implementation. In the example shown in FIG. 2, a hypothetical sensor device senses a physical event occurring at time t=1 s using a 10 kHz sampling. In graph 200, the peak measurement of 1 arbitrary unit occurs at t=1 s. Graph 250, a zoomed-in view of graph 200 around the peak region, shows that the peak measurement for the high rate internal sampling occurs exactly at t=1 s. FIG. 2 assumes that the internal high-rate sampling is ideal for the example sensor device, with no delay in the internal sampling, for illustration. Incidental delays in the high-rate sampling, if significant, can also be taken into account.

Figure 3:
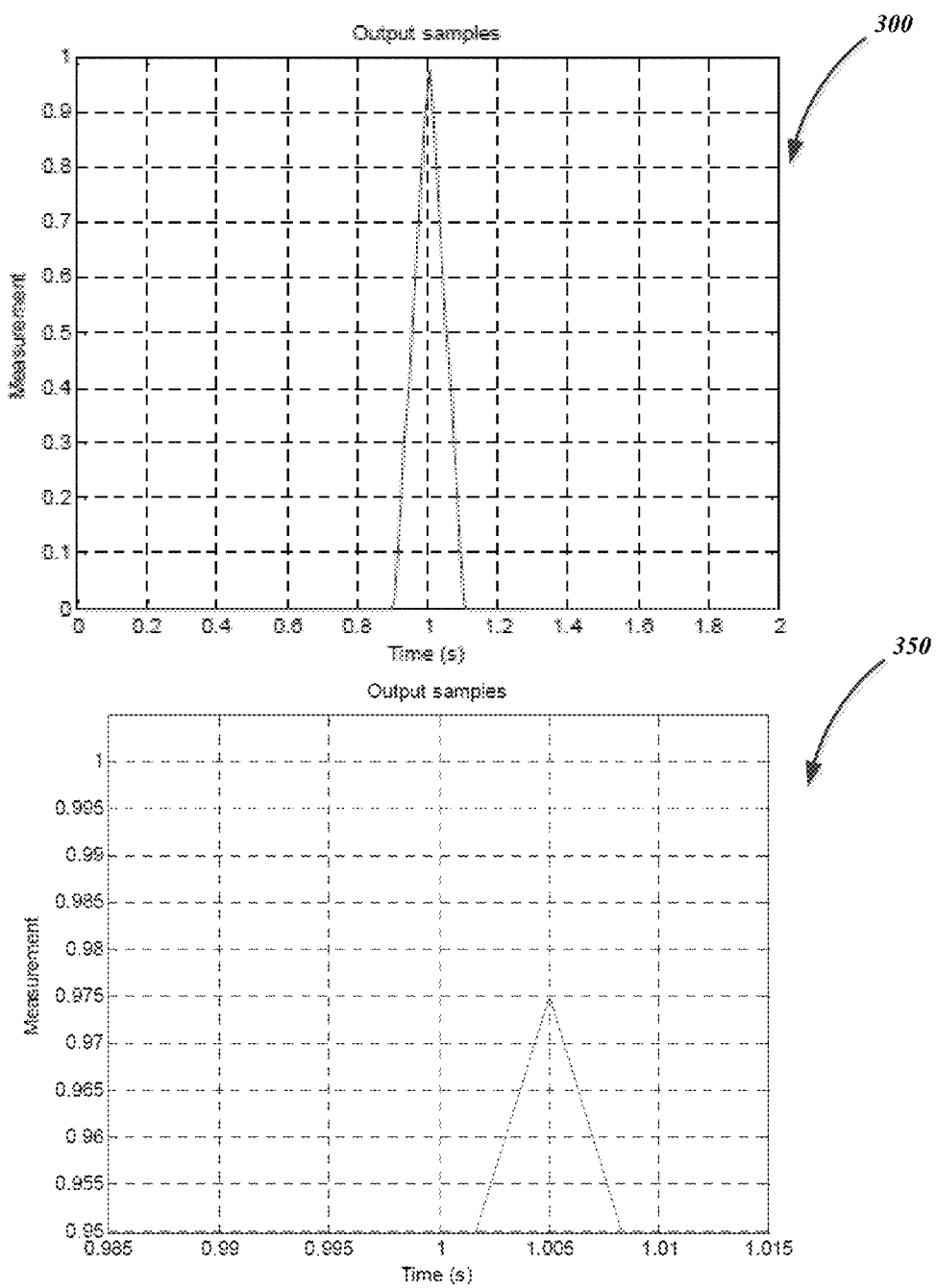
FIG. 3 is a graph depicting output samples of a sensor measurement versus time for a sensed event, according to an implementation.

FIG. 3 is a graph depicting output samples at 100 Hz of the sensor measurement versus time for the event shown in FIG. 2. In FIG. 3, graph 300 shows the peak measurement for output samples still apparently occurring close to t=1 s. However, as shown in graph 350—a zoomed-in version of graph 200 around its peak—the actual peak measurement for the output samples occurs at t=1.005 s, which is 5 ms later than the time when the physical event happened. This 5 ms delay can be explained by internal sensor delays occurring before the DRI is generated. For a system outside the sensor, can be difficult or costly to estimate, based on the output sample measurement, that the physical event occurred at t=1 s.

Figure 4:
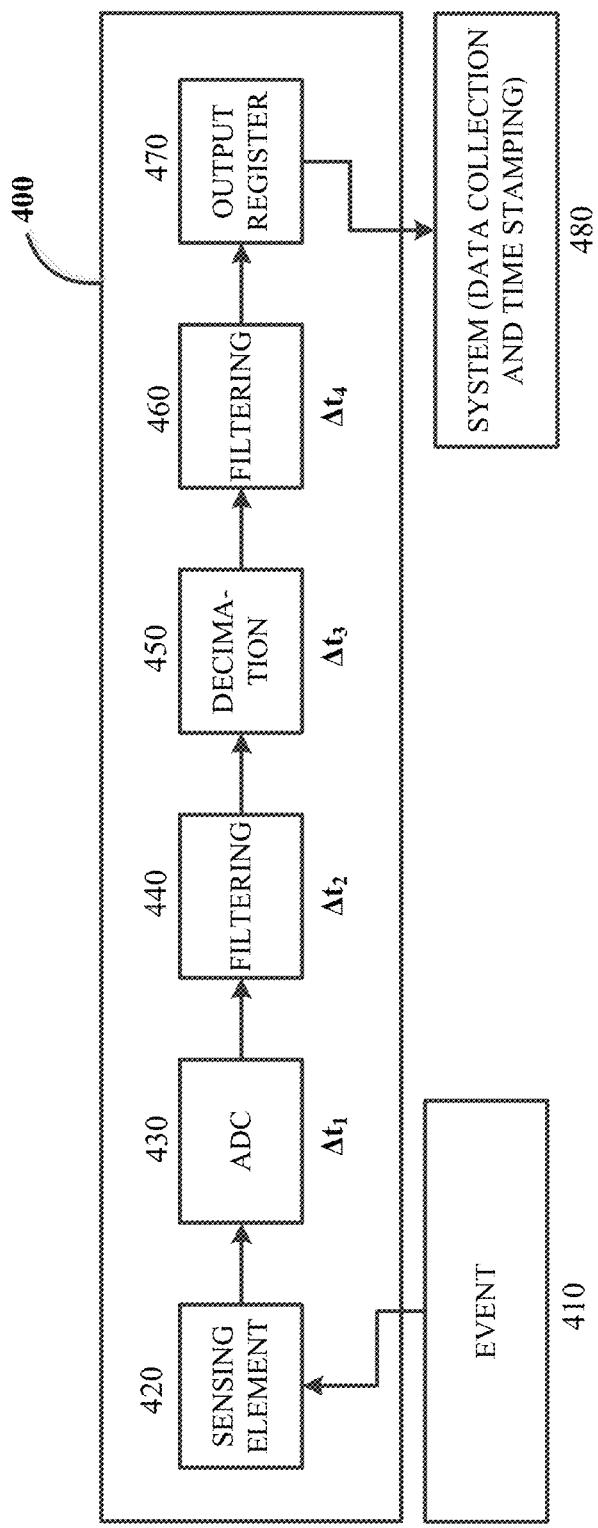
FIG. 4 illustrates the internal functioning of a sensor explaining source of time delay, according to an implementation.

FIG. 4 illustrates the internal functioning of a sensor device, explaining the source of time delay, according to an implementation. Sensor 400 is an exemplary sensor and can be any of a variety of sensors that can sense a physical event. "Physical event" or "event" in this context can refer to a measurement of a condition of an environment surrounding the sensor, or the detection of a change in the sensor's environment. As used herein, a sensor device can include sensors of various types such as a location sensor or a position locator (e.g., a Global Positioning System (GPS), an Estimote sensor, a location Beacon, an iBeacon sensor), an altimeter, a gyroscope, a magnetometer, a physical impact sensor, an accelerometer, an infra-red sensor, a visible light/image sensor, an ambient light sensor, a motion sensor, a gesture sensor, a temperature sensor or thermometer, or any other sensor.

In FIG. 4, block 410 corresponds to a physical event. Examples of physical events can include a change in position or environment of a mobile device that houses sensor 400. More particularly, sensor 400 can detect its own motion, rotation, vibration, acceleration etc. Other examples of physical events can include a measurement of a characteristic of the environment surrounding sensor 400. In one example, sensor 400 can be a camera, and the physical event can be an image capture. As another example, sensor 400 can be a GPS-based location sensor, and the physical event can be a location determination event.

Block 420 represents a sensing element that senses the occurrence of the physical event 410. The sensing element 420 can capture the physical event in analog form and transmit the analog signal regarding the physical event to an Analog to Digital Convertor (ADC) 430. The ADC can then convert the analog signal to a digital signal and can output the digital signal to a filtering element 440. The analog to digital conversion by ADC 430 can introduce a time delay of $\Delta t_1$ as shown in FIG. 1. Filtering element 440 can sample the digital signal at a sampling rate and send the filtered digital signal to decimation element 450. Filtering element 440 can introduce a second time delay $\Delta t_2$. The decimation element 450 can processes the filtered digital signal received from filtering element 440 in order to reduce the sampling rate, thereby creating a decimated digital signal. This decimation process can introduce a third time delay $\Delta t_3$. The decimation element 450 can send the decimated digital signal to filtering element 460. Filtering element 460 can filter the decimated digital signal and send it to output register 470 as the sensor reading. Filtering element 460 can introduce a fourth time delay $\Delta t_4$. The data collection and time stamping mechanism 480, located outside the sensor, can read the processed data from the output register 470 and assign a timestamp to it.

As shown in the case of example sensor 400, there is a total time delay of at least $(\Delta t_1+\Delta t_2+\Delta t_3+\Delta t_4)$ between the time the physical event occurs and the time at which the data output from the sensor is time stamped. This delay can occurs even if the time stamping mechanism introduces no further delay. As explained above, this time delay can be estimated from the design of the sensor. However, the internal components of the sensor may not be known to a system operating from outside the sensor. The time delay can be estimated by a system located outside the sensor, for example through controlled testing when the time of an event is precisely known. Calculating such estimates can be costly and/or impractical for every sensor for every condition.

According to implementations, the sensor device can indicate to a system with which it interacts, the time when a physical event, such as event 410 occurred. In implementations, the sensor device can acquire a sensor reading at a time when an event occurs. The sensor device can output a first value indicative of the sensor reading. In implementations, the first value can be a processed sensor reading after undergoing steps illustrated in FIG. 4. The sensor device itself can indicate to a system with which it interacts, the time when the event occurred. Such a system can be external to the sensor and can comprise the data acquisition system and time stamping system.

Figure 5:
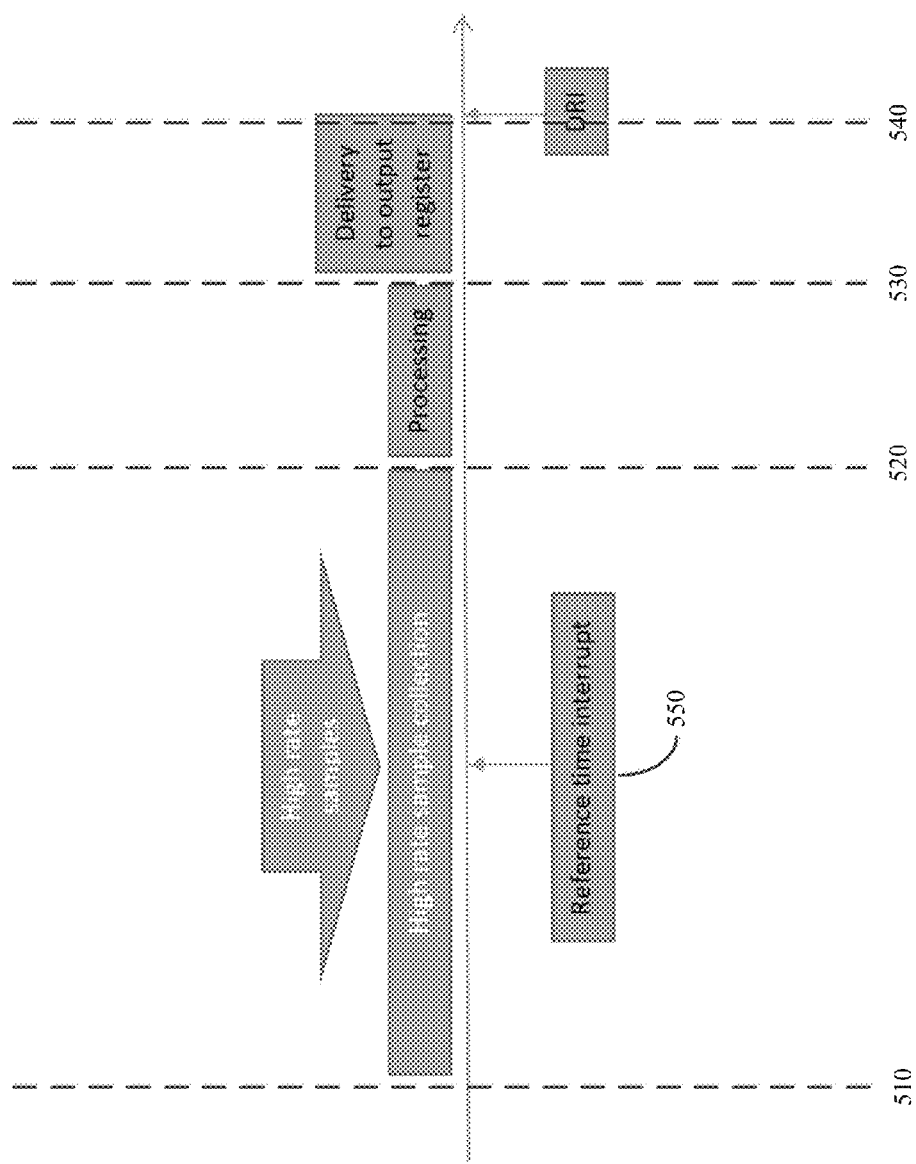
FIG. 5 illustrates a simplified timeline of a sensor measurement and sensor reading delivery including a reference time interrupt, according to an implementation.

In one example, the sensor device can indicate to a system with which it interacts, the time when the event occurred by generating one or more appropriate interrupts. FIG. 5 illustrates a simplified timeline of a sensor measurement and sensor reading delivery including a reference time interrupt, according to an implementation. In FIG. 5, a reference time interrupt 550 is generated at or close to the time when the event occurs between time 510 and time 520. As shown, the reference time interrupt is generated before the output sample is ready and delivered at time 540. In other words, the reference time interrupt is generated before the sensor reading is subject to one or more internal sensor delays between time 520 and 540, such as $\Delta t_1$, $\Delta t_2$, $\Delta t_3$, $\Delta t_4$ shown in FIG. 4. This reference time interrupt can be sensed by a system interacting with the sensor. In some implementations, several interrupts can be generated at various times during the high rate sample collection—for example in the beginning, somewhere in the middle, and/or at the end of the process between time 510 and time 520.

In some implementations, the sensor device can also indicate which reference time interrupt corresponds to which data ready interrupt. Such indication can be useful when several output samples or values indicative of sensor readings are output in a short period of time. For example, the sensor device can create a correspondence between reference time interrupts and DRIs by using a sequence number that ties the reference time interrupt, the DRI, and the sensor reading together. When a reference time interrupt is generated, a sequence number can also be generated by the sensor device and placed in a sequence number output buffer/register of the sensor device. The system interacting with the sensor, specifically the data acquisition system, can sense the reference time interrupt and store the time at which it is generated, and can also store the sequence number associated with the particular reference time interrupt. When a value indicative of the sensor reading is ready after processing, the sensor device can place the value in the sample output buffer/register together with the corresponding sequence number, and the data ready interrupt can be generated. The system can match the reference time to the value indicative of the sensor reading by matching the sequence number.

In some implementations, the sensor device can generate a nominal time interrupt signifying the nominal time of the sensor reading (i.e. an estimate of the time of the event) before the data ready interrupt indicates the presence of the value indicative of the sensor reading. The nominal time interrupt can be based on the sensor device's known or estimated internal time delay. In such implementations, the sensor can determine the internal delay on-the-fly for each sample and generate a nominal time interrupt earlier than the data ready interrupt by a time equal to the estimated internal delay.

In another example, the sensor can output to the system with which it interacts, a correction value to account for delays within the sensor device and to assist the system in estimating a time when the event occurred. The correction value can be indicative of the difference between the time when the event occurs and an output time. This output time can be the time at which the DRI is generated, the time at which the first value is output, and/or the time at which the correction value is output. The correction value can be made available as an item in an output register and can be usable by the system to estimate the time when the event occurred.

In some implementations, this correction value can represent a delay time. In implementations, the delay time can correspond to the total internal sensor delay time. The delay time can be expressed in absolute time units such as nanoseconds, milliseconds or microseconds. In other implementations, the delay time can be expressed in clock cycles of the sensor device. With each sample appearing at the output register/buffer, the delay time can also appear in the same or a different output register/buffer. In implementations, the correction value can be a code value that a system interacting with the sensor can use to look up to determine a delay time by using, for example, a table. Using the correction value, the system can then estimate the time at which the event corresponding to the sensor reading occurred.

In some implementations, for example when high accuracies are desired, the sensor device can generate a calibration interrupt that can enable the system to calibrate the sensor device time base. This can be useful for example, when the delay time is expressed in clock cycles of the sensor device. For example, if the sensor regularly generates a calibration interrupt at intervals determined by the sensor device, (for example every 1 second as calculated by the sensor device), the system can estimate the actual length of time that corresponds to the sensor device's 1 second, thereby transforming the sensor time to system time, and eventually actual time.

Figure 6:
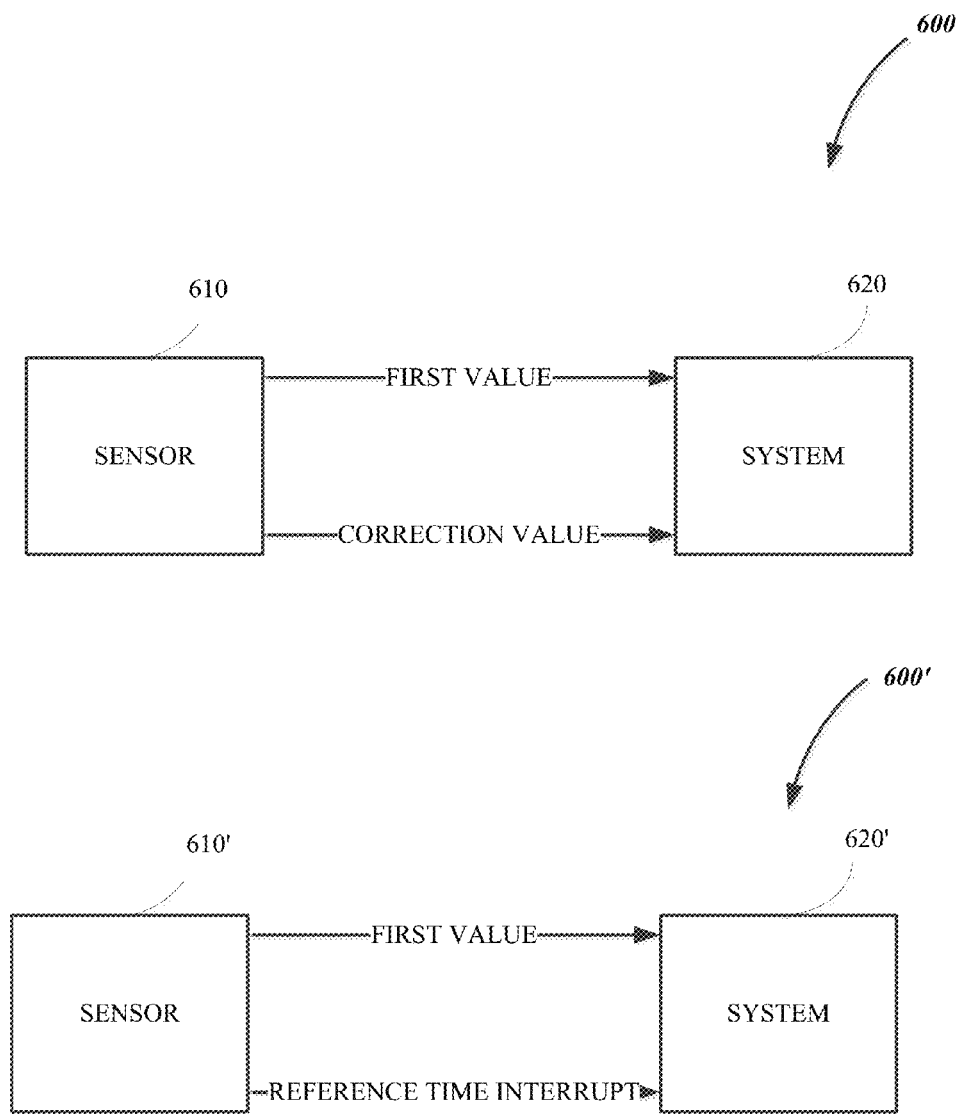
FIG. 6 is a simplified block diagram of the interaction between exemplary sensors and systems according to implementations.

FIG. 6 is a simplified block diagram of the interaction between exemplary sensor devices and systems according to implementations. In implementations illustrated in FIG. 6, systems 620 and 620' can have the advantage of not having to deduce internal sensor delays through costly computations and estimations.

In the example of sensor device-system ensemble 600, a sensor 610 interacts with a system 620. As shown in FIG. 6, sensor 610 outputs at least a first value and a correction value to system 620. The first value can be indicative of a sensor reading. For example, the first value can be a sensor reading processed by internal components of sensor 610. As explained above, the correction value can be used by the system to account for delays within the sensor device and to assist the system in estimating the time when the event occurred. In implementations, the correction value can be indicative of the difference between the time when the event occurs and an output time. In implementations, the first value and the correction value can be made available by the sensor as items at an output register or buffer.

In the other example shown in FIG. 6, in sensor device-system ensemble 600', a sensor 610' interacts with a system 620'. As shown in FIG. 6, sensor 610' outputs a first value to system 620'. The first value can be indicative of a sensor reading. For example, the first value can be a sensor reading processed by internal components of sensor 610'. Additionally, sensor 610' also generates a reference time interrupt that is readable by system 620'. As explained previously, system 620' can use the reference time interrupt to trigger a process for estimating the time when the event occurred based on the interrupt.

Figure 7:
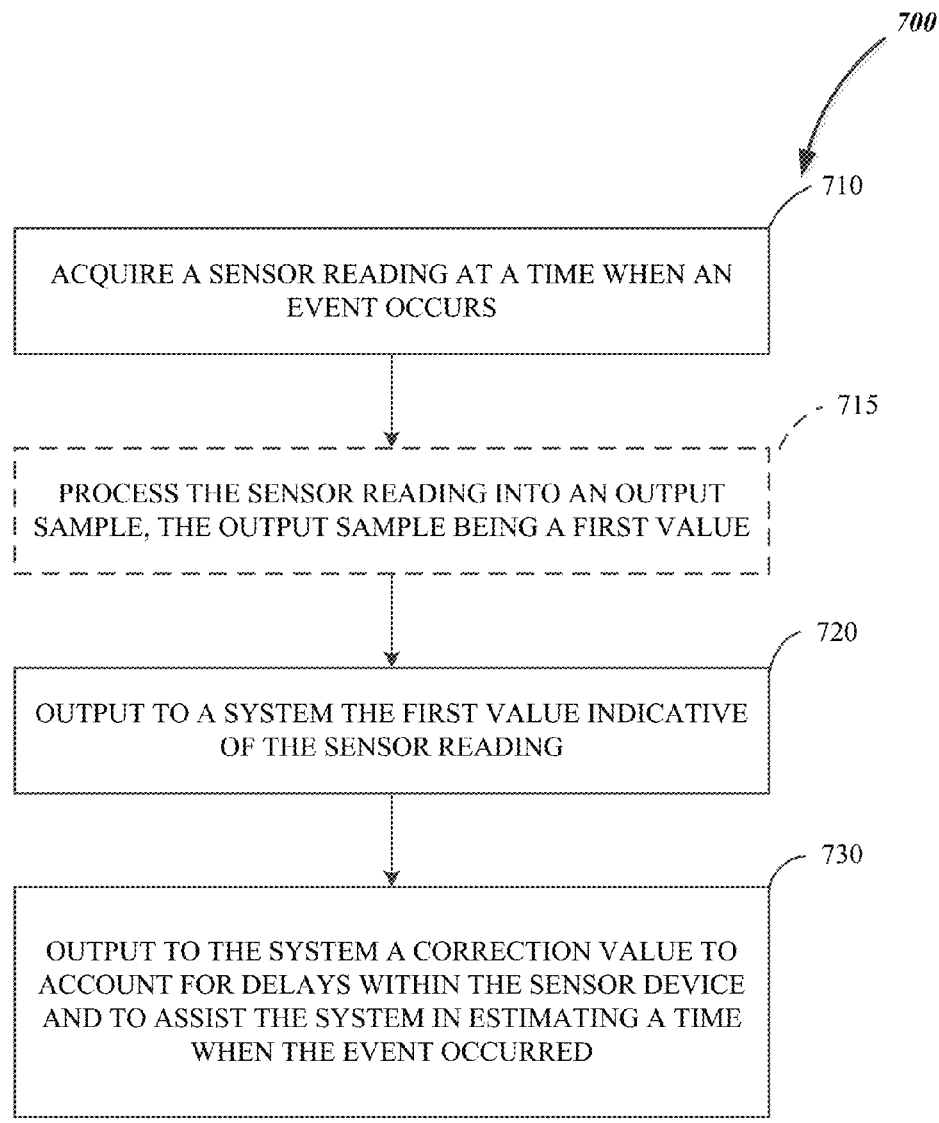
FIG. 7 illustrates an exemplary process at a sensor device according to an implementation.

FIG. 7 illustrates an exemplary process 700 at a sensor device according to an implementation. At block 710, process 700 includes acquiring a sensor reading at a time when an event occurs. At block 715, optionally, the sensor device can process the sensor reading into an output value. In implementations, this output value can be a first value indicative of the sensor reading. At block 720, process 700 includes outputting to a system, the first value indicative of the sensor reading. At block 730, process 700 includes outputting to the system a correction value to account for delays within the sensor device and to assist the system in estimating a time when the event occurred. The correction value can be indicative of the difference between the time when the event occurs and the output time. The correction value can be usable by the system to estimate the time when the event occurred. In implementations, the correction value can be a delay time. The delay time can be expressed, for example, in clock cycles of the sensor device or in absolute time.

Figure 8:
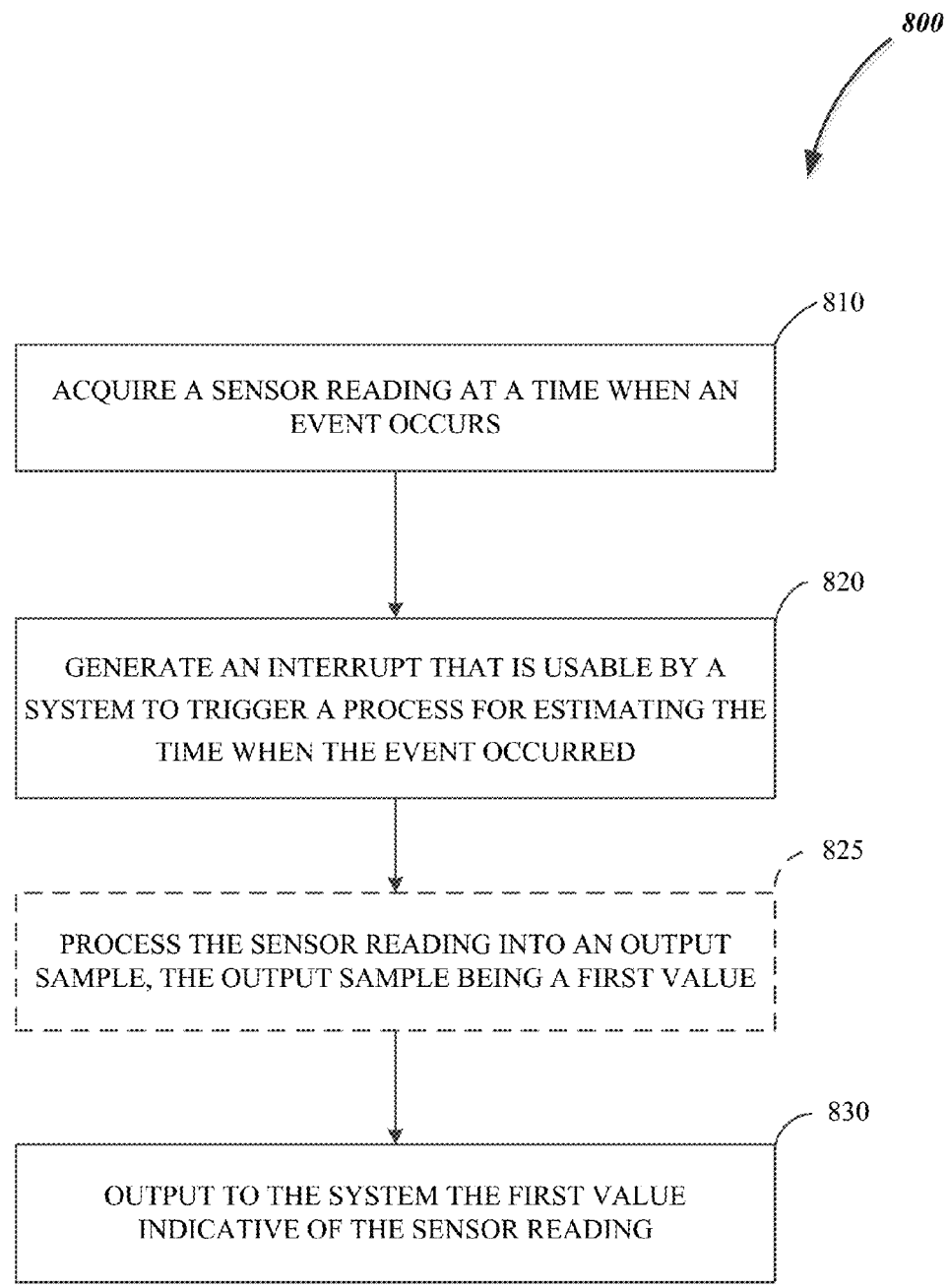
FIG. 8 illustrates an exemplary process at a sensor device according to another implementation.

FIG. 8 illustrates an exemplary process 800 at a sensor device according to another implementation. At block 810, process 800 includes acquiring a sensor reading at a time when an event occurs. At block 820, process 800 includes generating an interrupt that is usable by a system to trigger a process for estimating the time when the event occurred. At block 825, optionally, the sensor device can process the sensor reading into an output value. In implementations, this output value can be a first value indicative of the sensor reading. At block 830, process 800 includes outputting to the system the first value indicative of the sensor reading.

Figure 9:
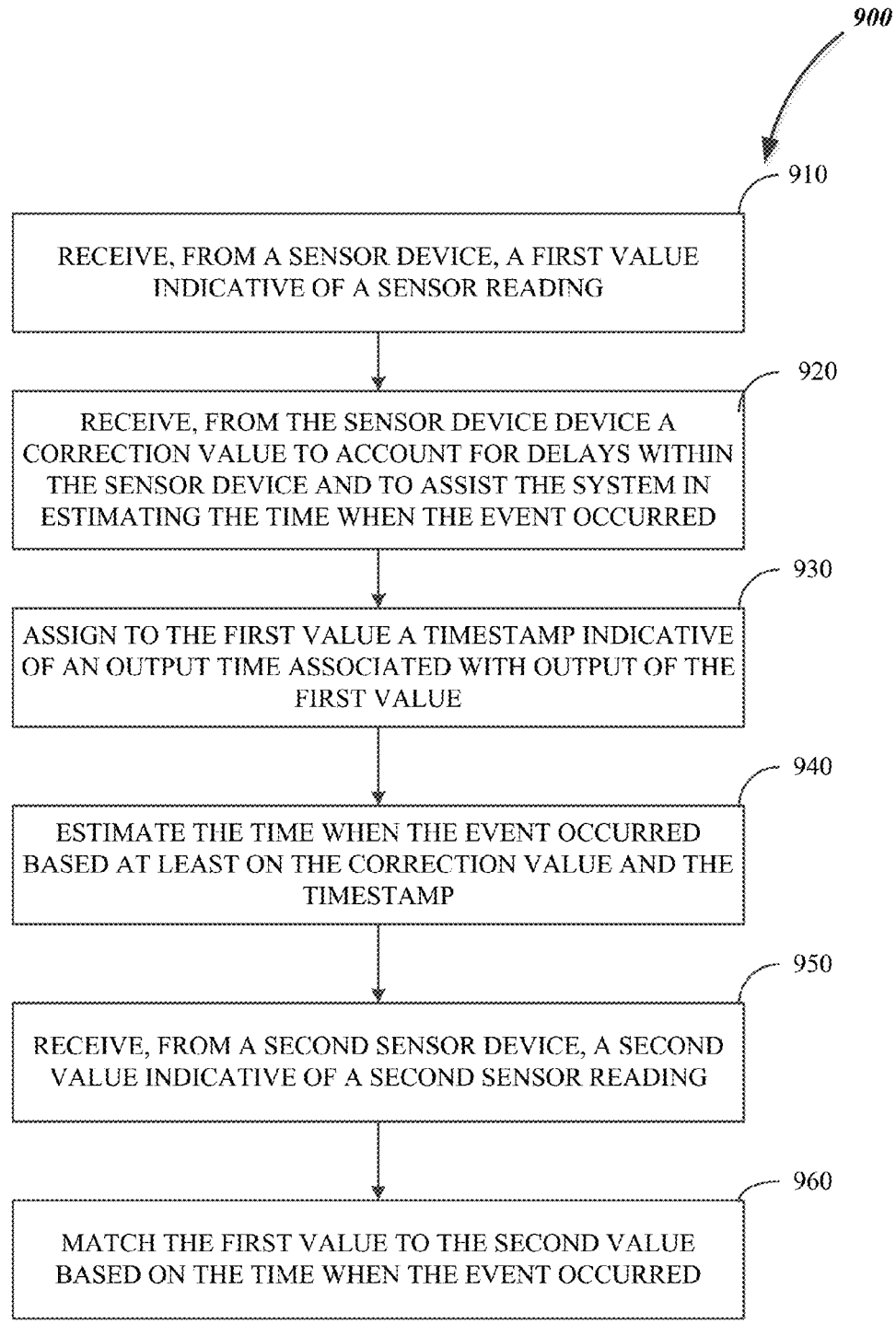
FIG. 9 illustrates an exemplary process at a system interacting with a sensor device, according to an implementation.

FIG. 9 illustrates an exemplary process 900 at a system interacting with a sensor device, according to an implementation. At block 910, process 900 includes receiving, from a sensor device, a first value indicative of a sensor reading. At block 920, process 900 includes receiving, from the sensor device, a correction value to account for delays within the sensor device and to assist the system in estimating the time when the event occurred. In other implementations, process 900 can include receiving an interrupt that is usable by the system to trigger a process for estimating the time when the event occurred. At block 930, process 900 can include assigning to the first value a timestamp indicative of an output time. The output time can be associated with the time the first value is output. At block 940, process 900 can include estimating the time when the event occurred based at least on the indication of the time when the event occurred and the timestamp.

In the implementation illustrated in FIG. 9, process 900 includes block 950 and 960, but other implementations may not include blocks 950 and 960. At block 950, process 900 includes, receiving, from a second sensor device, a second value indicative of a second sensor reading. At block 960, process 900 includes, matching the first value to the second value based on the time when the event occurred.

Figure 10:
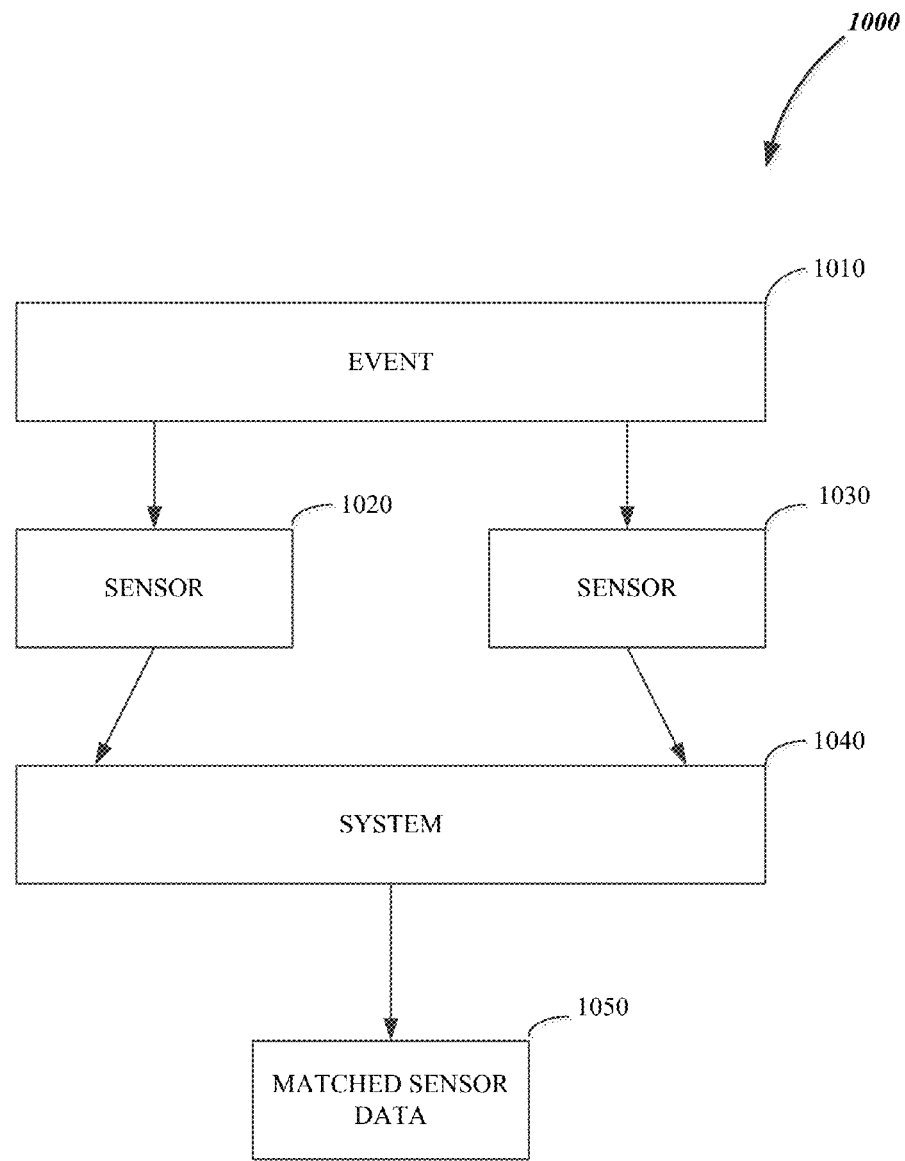
FIG. 10 illustrates an exemplary application of implementations to compensate for differing time delays between two sensors.

FIG. 10 illustrates an exemplary application of implementations to compensate for differing time delays between two sensor devices, sensor 1020 and sensor 1030. FIG. 10 will be explained for the example of sensor 1020 as a camera and sensor 1030 as a gyroscope, although the examples are not intended to be limiting. Also, although FIG. 10 illustrates two sensor devices, there could be a different number of sensor devices. The sensor devices can be located on the same device, or in implementations or different devices interacting with the same system.

As shown in FIG. 10, sensor 1020 and sensor 1030 detect an event 1010. In the example illustrated, sensors 1020 (here a camera) and 1030 (here a gyroscope) can be located in a mobile phone. A user may capture a video or image with the camera located in the mobile phone. A system in the mobile phone can utilize an image stabilization algorithm to compensate for camera shaking. The algorithm may compensate for movement by measurements made by the gyroscope also located in the mobile phone. For the image stabilization algorithm to perform efficiently, precise time-matching of data from the video camera and the gyroscope can be required. System 1040 reads not only values indicative of sensor readings from sensors 1020 and 1030, but also indications from sensors 1020 and 1030 that are usable by system 1040 to estimate the time of the event that the values correspond to. Using such indications, image data coming from sensor 1020 (here camera) can be time matched with corresponding movement data coming from sensor 1030 (gyroscope). Matched data 1050 can then be passed on for further processing.

In another example, sensor 1020 can be a gyroscope and sensor 1030 can be an accelerometer. During a high speed inertial navigation operation (such as when satellite-based navigation is unavailable), if the time matching of the sensors has an error, the navigation performance will likely suffer, and a user may be provided with inaccurate instructions. In such a case, using methods described above, a mobile device can match precisely its orientation data with acceleration data to provide navigation instructions to a user.

Figure 11:
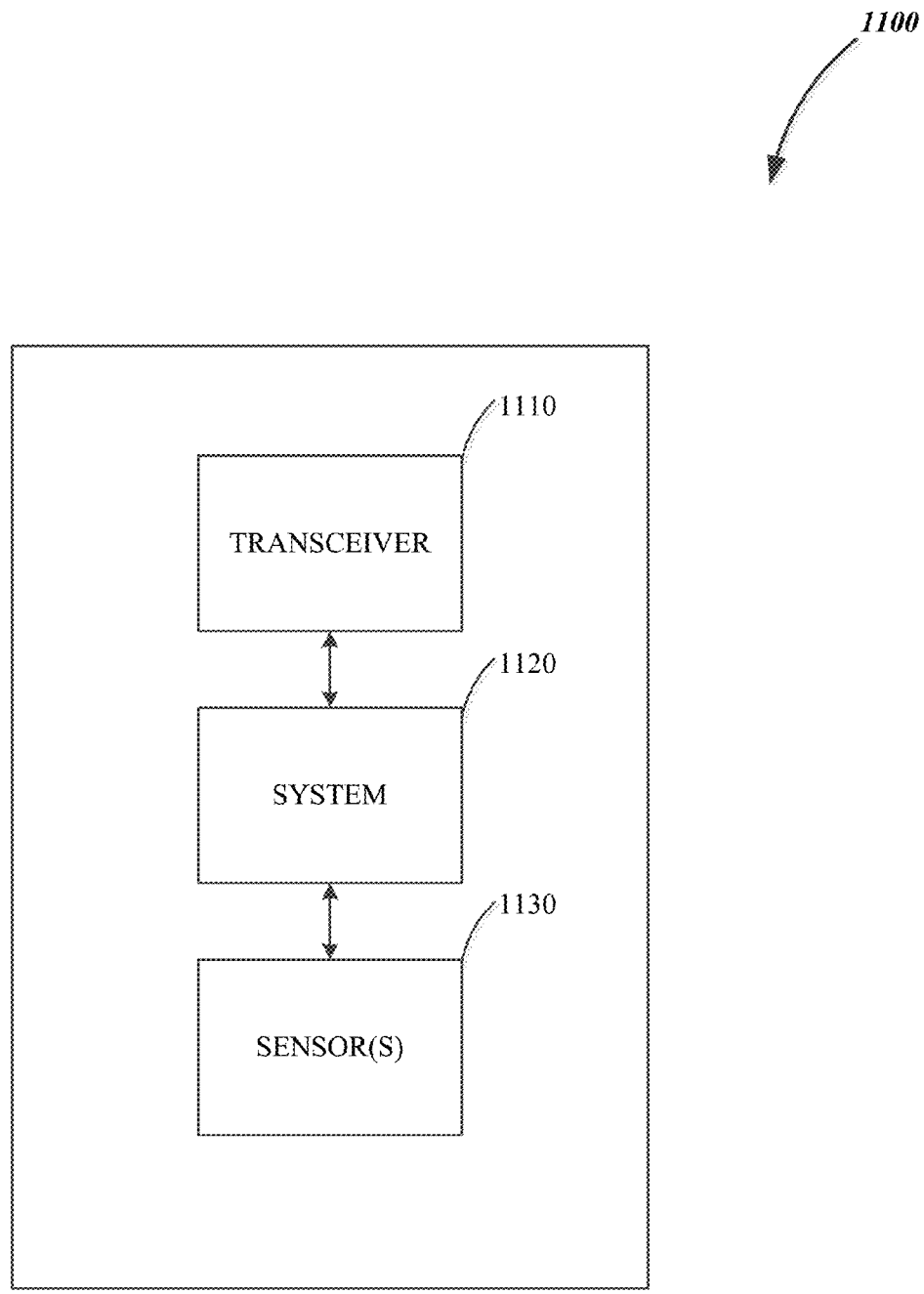
FIG. 11 is illustrates an example device incorporating implementations.

FIG. 11 illustrates an example device 1100 incorporating implementations. For example, device 1100 can be a mobile device such as cell phone, smart phone, tablet computer, Personal Digital Assistant (PDA), GPS-based navigation unit, and the like, or other devices such as desktop computers, smart climate control systems, weather devices, appliances connected to the Internet of Things (IoT), and the like. As shown in FIG. 11, device 1100 comprises a transceiver 1110. Transceiver 1110 can be used to transmit and receive data over a network such as a cellular network, WiFi, Bluetooth, etc. In other examples, device 1100 may not include a transceiver.

As shown in FIG. 1100, device 1100 includes one or more sensors 1130 and system 1120 according to implementations. System 1120 can interact with sensors 1130 as explained in the examples in FIG. 6.

Figure 12:
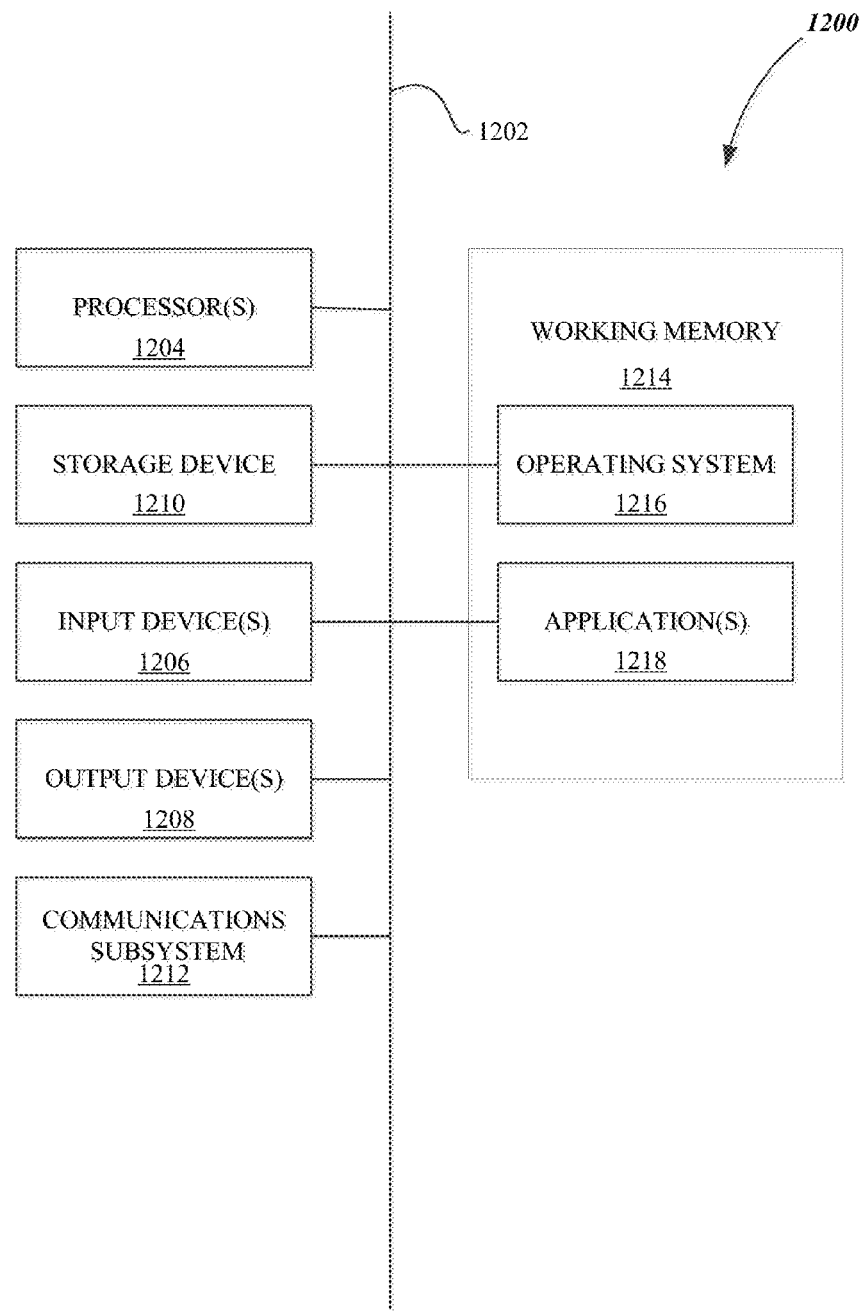
FIG. 12 shows an example computer device incorporating implementations.

FIG. 12 shows an example computer device 1200 in accordance with the disclosure. An example of a computer device includes a sensor chip such as a MEMS sensor for example, a data acquisition system, a desktop computer, laptop computer, tablet computer, personal data assistant, smartphone, and/or any other type of special-purpose machine configured for performing calculations.

Computer device 1200 is shown comprising hardware elements that may be electrically coupled via a bus 1202 (or may otherwise be in communication, as appropriate). The hardware elements may include a processing unit with one or more processors 1204, including without limitation one or more general-purpose processors and/or one or more special-purpose processors (such as digital signal processing chips, graphics acceleration processors, and/or the like); one or more input devices 1206, which may include without limitation a remote control, a mouse, a keyboard, and/or the like; and one or more output devices 1208, which may include without limitation a presentation device (e.g., television), a printer, and/or the like.

The computer device 1200 may further include (and/or be in communication with) one or more non-transitory storage devices 1210, which may comprise, without limitation, local and/or network accessible storage, and/or may include, without limitation, a disk drive, a drive array, an optical storage device, a solid-state storage device, such as a random access memory, and/or a read-only memory, which may be programmable, flash-updateable, and/or the like. Such storage devices may be configured to implement any appropriate data stores, including without limitation, various file systems, database structures, and/or the like.

The computer device 1200 might also include a communications subsystem 1212, which may include without limitation a modem, a network card (wireless and/or wired), an infrared communication device, a wireless communication device and/or a chipset such as a Bluetooth™ device, 802.11 device, WiFi device, WiMax device, cellular communication facilities such as GSM (Global System for Mobile Communications), W-CDMA (Wideband Code Division Multiple Access), LTE (Long Term Evolution), etc., and/or the like. The communications subsystem 1212 may permit data to be exchanged with a network (such as the network described below, to name one example), other computer systems, and/or any other devices described herein. In many examples, the computer system 1200 will further comprise a working memory 1214, which may include a random access memory and/or a read-only memory device, as described above.

The computer device 1200 also may comprise software elements, shown as being currently located within the working memory 1214, including an operating system 1216, device drivers, executable libraries, and/or other code, such as one or more application programs 1218, which may comprise computer programs provided by various examples, and/or may be designed to implement methods, and/or configure systems, provided by other examples, as described herein. By way of example, one or more procedures described with respect to the method(s) discussed above, and/or system components might be implemented as code and/or instructions executable by a computer (and/or a processor within a computer); in an aspect, then, such code and/or instructions may be used to configure and/or adapt a general purpose computer (or other device) to perform one or more operations in accordance with the described methods.

A set of these instructions and/or code might be stored on a non-transitory computer-readable storage medium, such as the storage device(s) 1210 described above. In some cases, the storage medium might be incorporated within a computer system, such as computer system 1200. In other examples, the storage medium might be separate from a computer system (e.g., a removable medium, such as flash memory), and/or provided in an installation package, such that the storage medium may be used to program, configure, and/or adapt a general purpose computer with the instructions/code stored thereon. These instructions might take the form of executable code, which is executable by the computer device 1200 and/or might take the form of source and/or installable code, which, upon compilation and/or installation on the computer system 1200 (e.g., using any of a variety of generally available compilers, installation programs, compression/decompression utilities, etc.), then takes the form of executable code.

It will be apparent that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some examples may employ a computer system (such as the computer device 1200) to perform methods in accordance with various examples of the disclosure. According to a set of examples, some or all of the procedures of such methods are performed by the computer system 1200 in response to processor 1204 executing one or more sequences of one or more instructions (which might be incorporated into the operating system 1216 and/or other code, such as an application program 1218) contained in the working memory 1214. Such instructions may be read into the working memory 1214 from another computer-readable medium, such as one or more of the storage device(s) 1210. Merely by way of example, execution of the sequences of instructions contained in the working memory 1214 may cause the processor(s) 1204 to perform one or more procedures of the methods described herein.

The terms "machine-readable medium" and "computer-readable medium," as used herein, may refer to any non-transitory medium that participates in providing data that causes a machine to operate in a specific fashion. In an example implemented using the computer device 1200, various computer-readable media might be involved in providing instructions/code to processor(s) 1204 for execution and/or might be used to store and/or carry such instructions/code. In many implementations, a computer-readable medium is a physical and/or tangible storage medium. Such a medium may take the form of a non-volatile media or volatile media. Non-volatile media may include, for example, optical and/or magnetic disks, such as the storage device(s) 1210. Volatile media may include, without limitation, dynamic memory, such as the working memory 1214.

Example forms of physical and/or tangible computer-readable media may include a floppy disk, a flexible disk, hard disk, magnetic tape, or any other magnetic medium, a compact disc, any other optical medium, ROM (Read Only Memory), RAM (Random Access Memory), and etc., any other memory chip or cartridge, or any other medium from which a computer may read instructions and/or code. Various forms of computer-readable media may be involved in carrying one or more sequences of one or more instructions to the processor(s) 1204 for execution. By way of example, the instructions may initially be carried on a magnetic disk and/or optical disc of a remote computer. A remote computer might load the instructions into its dynamic memory and send the instructions as signals over a transmission medium to be received and/or executed by the computer system 1200.

The communications subsystem 1212 (and/or components thereof) generally will receive signals, and the bus 1202 then might carry the signals (and/or the data, instructions, etc. carried by the signals) to the working memory 1214, from which the processor(s) 1204 retrieves and executes the instructions. The instructions received by the working memory 1214 may optionally be stored on a non-transitory storage device 1210 either before or after execution by the processor(s) 1204.

It should further be understood that the components of computer device 1200 can be distributed across a network. For example, some processing may be performed in one location using a first processor while other processing may be performed by another processor remote from the first processor. Other components of computer device 1200 may be similarly distributed. As such, computer device 1200 may be interpreted as a distributed computing system that performs processing in multiple locations. In some instances, computer device 1200 may be interpreted as a single computing device, such as a distinct laptop, desktop computer, wearable heart monitor, or the like, depending on the context.

The methods, systems, and devices discussed above are examples. Various configurations may omit, substitute, or add various method steps or procedures, or system components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those of skill with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations may be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Furthermore, the example described herein may be implemented as logical operations in a computing device in a networked computing system environment. The logical operations may be implemented as: (i) a sequence of computer implemented instructions, steps, or program modules running on a computing device; and (ii) interconnected logic or hardware modules running within a computing device.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for reducing sensor reading time error comprising:
    at a sensor device, acquiring a sensor reading at a time when an event occurs;
    at the sensor device, obtaining a first timestamp associated with the acquisition of the sensor reading;
    at the sensor device, outputting to a system, a first value indicative of the sensor reading;
    at the sensor device, obtaining a second timestamp associated with the outputting of the first value;
    at the sensor device, determining a correction value to account for delays within the sensor device, the determination of the correction value being based on a difference between the first timestamp and the second timestamp; and
    at the sensor device, outputting to the system, the correction value to assist the system in estimating the time when the event occurred.

2. The method of claim 1, further comprising, at the sensor device, processing the sensor reading into an output sample, the first value being the output sample.

3. The method of claim 1, wherein the correction value is indicative of the difference between the time when the event occurs and an output time associated with output of the first value from the sensor device to the system.

4. The method of claim 1, wherein the method further comprises:
    generating an interrupt that is usable by the system to trigger a process for estimating the time when the event occurred.

5. The method of claim 3, wherein the correction value is a delay time.

6. The method of claim 5, wherein the delay time is expressed in clock cycles of the sensor device.

7. The method of claim 5, wherein the delay time is expressed in absolute time.

8. The method of claim 4, further comprising generating a sequence number usable by the system to match the interrupt with the first value indicative of the sensor reading.

9. A sensor device comprising:
    a sensing element configured to acquire a sensor reading at a time when an event occurs;
    a first output register configured to output to a system a first value indicative of the sensor reading; and
    a second output register configured to output to the system a corrective value to account for delays within the sensor device and to assist the system in estimating the time when the event occurred,
    wherein the sensor device is configured to:
        obtain a first timestamp associated with the acquisition of the sensor reading at the sensing element;
        obtain a second timestamp associated with the outputting of first value;
        determine the corrective value based on a difference between the first timestamp and the second timestamp; and
        provide the corrective value to the second output register for outputting to the system.

10. The sensor device of claim 9, further comprising one or more processors configured to process the sensor reading into an output sample, the first value being the output sample.

11. The sensor device of claim 9, wherein the correction value is indicative of the difference between the time when the event occurs and an output time associated with output of the first value.

12. The sensor device of claim 9, further comprising one or more processors configured to generate an interrupt that is usable by the system to trigger a process for estimating the time when the event occurred.

13. The sensor device of claim 9, wherein the correction value is a delay time.

14. The sensor device of claim 13, wherein the delay time is expressed in clock cycles of the sensor device.

15. The sensor device of claim 13, wherein the delay time is expressed in absolute time units.

16. The sensor device of claim 12 wherein the processors are further configured to generate a sequence number usable by the system to match the interrupt with the first value indicative of the sensor reading.

17. An sensor device comprising:
    means for acquiring a sensor reading at a time when an event occurs;
    means for obtaining a first timestamp associated with the acquisition of the sensor reading;

means for outputting to a system a first value indicative of the sensor reading;
means for obtaining a second timestamp associated with the outputting of the first value;
means for determining a correction value based on a difference between the first timestamp and the second timestamp; and
means for outputting to the system, the correction value to assist the system in estimating the time when the event occurred.

18. The sensor device of claim 17 further comprising means for processing the sensor reading into an output sample, the first value being the output sample.

19. The sensor device of claim 17, wherein the correction value is indicative of the difference between the time when the event occurs and an output time associated with output of the first value.

20. The sensor device of claim 17 further comprising means for generating an interrupt that is usable by the system to trigger a process for estimating the time when the event occurred.

21. The sensor device of claim 17, wherein the correction value is a delay time.

22. The sensor device of claim 21, wherein the delay time is expressed in clock cycles of the sensor device.

23. The sensor device of claim 21, wherein the delay time is expressed in absolute time units.

24. A non-transitory computer-readable medium having stored instructions thereon, which when executed by a processor, perform a method comprising:
acquiring a sensor reading at a time when an event occurs;
obtaining a first timestamp associated with the acquisition of the sensor reading;
outputting to a system, a first value indicative of the sensor reading;
obtaining a second timestamp associated with the outputting of the first value;
determining a correction value to account for delays within a sensor device, the determination of the correction value being based on a difference between the first timestamp and the second timestamp; and
outputting to the system the correction value to assist the system in estimating the time when the event occurred.

25. The computer-readable medium of claim 24, wherein the method further comprises processing the sensor reading into an output sample, the first value being the output sample.

26. The computer-readable medium of claim 24, wherein the correction value is indicative of the difference between the time when the event occurs and an output time associated with output of the first value from the sensor device to the system.

27. The computer-readable medium of claim 24, wherein the method further comprises:
generating an interrupt that is usable by the system to trigger a process for estimating the time when the event occurred.

28. The computer-readable medium of claim 24, wherein the correction value is a delay time.

29. The computer-readable medium of claim 28, wherein the delay time is expressed in clock cycles of the sensor device.

30. The computer-readable medium of claim 28, wherein the delay time is expressed in absolute time.

31. The method of claim 1, further comprising:
at the sensor device, outputting to the system, a first indication associated with the first timestamp;
at the sensor device, outputting to the system, a second indication associated with the second timestamp;
wherein the outputting of the first indication and the second indication to the system enables the system to determine the delays within the sensor device.

32. The method of claim 31, further comprising:
at the sensor device, outputting to the system, an identifier associated with the first indication and with the second indication; and
wherein the outputting of the identifier enables the system to:
pair the first indication with the second indication; and
determine the delays within the sensor device based on a time difference between when the first indication is generated and when the second indication is generated.

33. The method of claim 32, wherein the first indication is output between a first time when the sensor reading is acquired and a second time when the sensor starts processing the sensor reading to generate the first value.

34. The method of claim 33, wherein the second timestamp indicates a third time when the second indication is output to the system by the sensor device.

35. The method of claim 33, wherein the second timestamp indicates a third time when the first value is generated at the sensor device.

36. The method of claim 33, wherein the second timestamp indicates a third time when the correction value is output to the system by the sensor device.

37. The method of claim 32, wherein the first indication and the second indication are interrupts.

* * * * *